Dec. 12, 1950   G. J. KOCH   2,533,474
CEMENTED TRANSPARENCY
Filed Dec. 17, 1948

GEORGE J. KOCH
INVENTOR

BY
ATTORNEYS

Patented Dec. 12, 1950

2,533,474

UNITED STATES PATENT OFFICE 2,533,474

CEMENTED TRANSPARENCY

George J. Koch, Rochester, N. Y., assignor to Eastman Kodak Company, Rochester, N. Y., a corporation of New Jersey Application December 17, 1948, Serial No. 65,907

8 Claims. (Cl. 40—158)

The present invention relates to projectors, and more particularly to lantern slides for use in connection therewith.

The principal object of the invention is the provision of a lantern slide in which the image to be projected is connected to or mounted on a rigid support which serves to retain the image in a plane and to eliminate buckling thereof during projection.

Another object of the invention is the provision of a slide in which the image is carried by a film, and the image is cemented to a gelatin-coated transparent rigid plate which serves to support the image to maintain the latter in a plane relative to and sandwiched between the film base and the plate.

Still another object of the invention is the provision of a film supporting glass plate which is adapted to cooperate with positioning members in the projector to adjust and maintain the image in axial position relative to the projector parts.

Yet another object of the invention is the provision of a simple holder or mount for the glass-mounted film.

Still another object of the invention is the provision of a slide of the type described which is rugged in construction, easy to handle and highly effective in use.

To these and other ends, the invention resides in certain improvements and combinations of parts, as will be hereinafter more fully described, the novel features being pointed out in the claims at the end of the specification.

In the drawings.

Similar reference numerals throughout the various views indicate the same parts.

Figure 1:
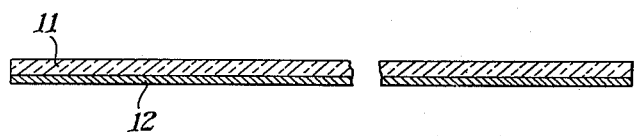
Fig. 1 is a sectional view of a film strip, showing the relation thereto of a sensitized photographic emulsion coating.
Figure 2:
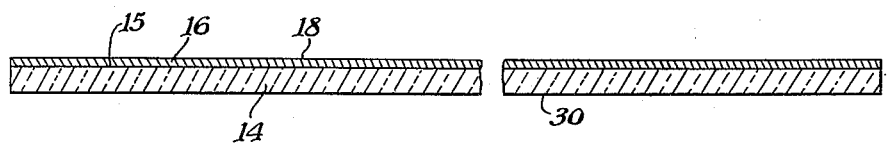
Fig. 2 is a sectional view through a gelatin-coated glass plate on which the film strip is to be mounted with the emulsion of the film against the gelatin coating on the glass.

Fig. 1 of the drawings shows a transparency comprising a support 11, preferably a transparent film base, one side of which carries the usual photographic sensitive emulsion 12 in which an image 13 is formed. As such a structure is of well known composition, no further details are deemed necessary.

A rigid transparent sheet 14 such, for example, as glass or suitable plastic, has one side 15 thereof coated with a transparent adhesive layer such as gelatin, cellulose esters, synthetic resins or similar materials, but preferably gelatin. The glass sheet 14 is preferably, although not necessarily, larger than the film base 11, for reasons to be later more fully described. The base 11 with its emulsion coating 12 is adapted to be arranged centrally on the gelatin coating 15 with the emulsion 12 facing the coating, as clearly shown in Fig. 3. By means of this arrangement, the sensitive emulsion 12 is sandwiched between the film base 11 and the glass sheet 14, the advantages of which are deemed apparent to those in the art.

Prior to the mounting of the film on the glass plate, a layer of cement 17 is applied preferably to the emulsion layer 12. This cement may be what is known technically as a cement, or it may be any solvent or liquid which has a tendency to dissolve or soften the emulsion 12 and/or the gelatin layer 16. Such materials, however, cause the emulsion layer 12 and the gelatin layer 16 to adhere to each other to connect the film to the gelatin surface of the glass sheet and retain the image-bearing emulsion 12 in a plane between the base 11 and the glass sheet 14. These adhering materials may, therefore, be considered broadly as cements. For use with colored, image-bearing films, such, for example, as "Kodachrome," the following cement has been found satisfactory. This cement also eliminates bleeding of the colors, the advantages of which are apparent.

2% Gelatin
0.1% Wetting agent (emulphor 0)
97.9% Water

For black-and-white films one suitable cement may be of the following composition:

20% Ethylene chlorohydrin
32% Acetone
8% Ammonium hydroxide (28% solution)
40% Water However, the preferred cement for use with black-and-white films has the following composition:

50% Lactic acid
50% Water

Figure 3:
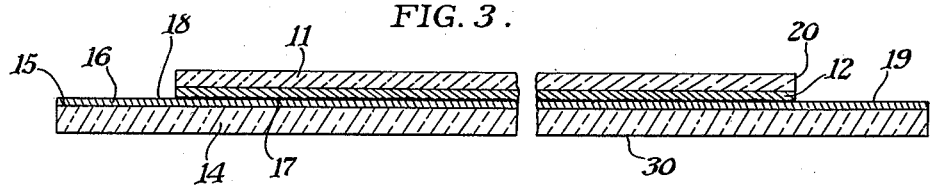
Fig. 3 is a sectional view through the film and gelatin-coated glass assembly, showing the relation of the parts.

The cement, or softening agent, is applied preferably to the emulsion 12 and the latter is pressed firmly against the exposed surface 18 of the gelatin coating 16, as shown in Fig. 3, to adhere the emulsion to the coating so as to connect the transparency to the gelatin-coated glass. The preferred method of carrying out this operation is to roll the wet film onto the gel-coated glass with a wringer. The rolling action prevents the trapping of air bubbles and results in rapid adhesion because it removes the excess cement. As the glass sheet 14 is larger than the transparency, gelatin-coated areas 19 of the glass plate will project laterally beyond the edges 20 of the transparency, as shown in Figs. 3 to 6. The final laminated film and glass structure is shown in Fig. 3.

Figure 5:
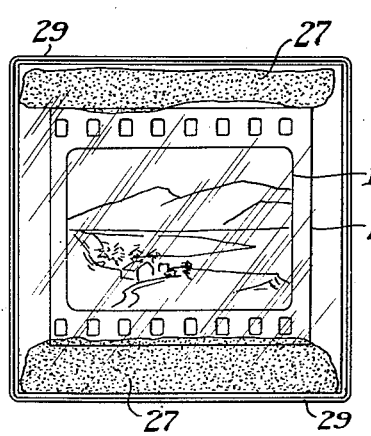
Fig. 5 is a front elevation view of the complete lantern slide.
Figure 6:
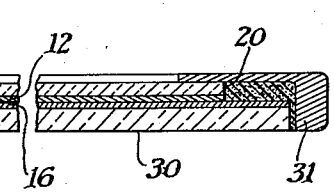
Fig. 6 is a partial sectional view through a portion of a modified mount structure.

The mounted film structure of Fig. 3 is then positioned in and connected to a cup-shaped holder formed from opaque sheet material, such as sheet aluminum or other similar light metal, to provide a bottom or supporting portion 25 which is of a size slightly larger than the sheet 14 to enable a small degree of movement of the latter relative to the bottom to bring the image area 13 of the transparency into exact registration with the central aperture 26 formed in the bottom 25. A cement 27 is then used to adhere the exposed gelatin areas 19 directly to the inner face 27a of the bottom 25 outside the edges 20 of the transparency, as illustrated in Fig. 6. Such a cement should be slightly yieldable or flexible so as to be able to withstand shock or heat without cracking or breaking. While all four of the exposed areas 19 may be thus adhesively connected or cemented to the face 27a, it has been found sufficient to connect only two opposite areas, as illustrated in Fig. 5. One form of cement adapted for the purpose has the following composition:

25% Butyl methacrylate
75% Xylene

By means of this cement, the laminated transparency and gelatin-coated glass structure is secured adhesively to the mount. Before the cement sets, the glass sheet 14, with the film attached thereto, may be shifted slightly relative to the bottom 25 to bring the image 13 into exact registry with the aperture 26. The parts will then be in the position shown in Figs. 4 to 6.

Figure 4:
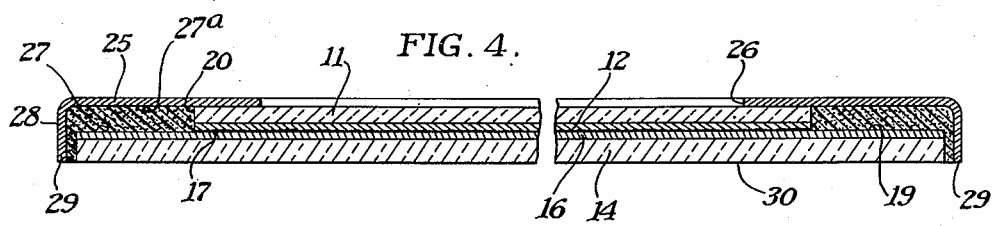
Fig. 4 is a view similar to Fig. 3, but showing the glass and film mounted in a mount or holder.

In order to protect the exposed edges of the glass sheet 14, the bottom 25 is formed with marginal flanges 28 which project normal to the bottom 25 to cooperate therewith to provide a cup-shaped mount in which the laminated film and glass members are positioned, as best shown in Fig. 4. The free ends 29 of the flanges 28 terminate substantially in the plane of the exposed side or face 30 of the glass sheet 14 so that the latter has the entire area thereof exposed. If desired, the cement 27 may extend between the edges 20 and the flanges 28, as shown in Figs. 4 and 6. This flange arrangement is highly desirable in that when the above-described lantern slide is used in a projection apparatus, the face 30 of the sheet 14 may be utilized to engage pins or other positioning members in the projector to maintain the image area 12 in a definite axial relation with projector parts, the advantages of which are deemed apparent to those in the art. Also, as the entire surface 30 is exposed, it may be readily and easily cleaned. As the image-carrying film is laminated to the gelatin-coated glass, the latter provides the necessary protection for the sensitized emulsion surface and also the desired rigidity to hold the film area in a plane during projection.

Fig. 6 shows a slightly modified arrangement of the mount which differs from that shown in Figs. 4 and 5 only in that the flanges 31 are materially thicker than the flanges 28. This modified arrangement affords a stronger and more attractive mount which is less likely to catch in the slide-changing mechanism of the projector.

While it is preferred to form the coating 16 of gelatin, this coating may be of a suitable thermoplastic material or a resin dissolved in a suitable solvent to which emulsion coating 12 may be adhered by heat or by solvent or softening action.

The base 11 and glass sheet 14 are preferably both transparent. For projection, particularly in connection with colored images, the emulsion side is positioned toward the projection screen. In such an arrangement, the light will be directed from the top, Fig. 4. In such an arrangement it may be desirable to provide some light-diffusing means which may be in the form of separate diffusing plates positioned behind the film base or some light-diffusing material may be incorporated directly in the film base itself. However, as the glass plate 14 is on the screen side of the image, the plate should be transparent. However, for some special condition, it may be found desirable to project from the opposite side, or from the bottom as viewed in Fig. 4, the light then being directed toward the side 30 of the glass sheet 14. In this case, a separate diffusing screen may be positioned below the glass plate 14, or the light-diffusing material may be incorporated directly in the plate itself or in the gelatin coating.

The present invention thus provides a lantern slide in which the image area of the film is rigidly supported to maintain it in a plane even when being projected, and is protected against damage. The protective and supporting glass cooperates with members or positioning elements in the projector to arrange the image area in proper and definite axial relation to the projector parts to maintain the image area in proper focus, the advantages of which are apparent. Also, as the exposed surface of the supporting glass has a full area thereof exposed, it may be readily and easily cleaned.

While certain embodiments of the invention have been disclosed, it is to be understood that the inventive idea may be carried out in a number of ways. This application is, therefore, not to be limited to the precise details described but is intended to cover all variations and modifications falling within the scope of the appended claims.

I claim:

1. A lantern slide comprising, in combination, a light transmitting sheet, a light transmitting coating on one side of said sheet, a transparency having an image positioned on one side thereof and adjacent said coating, light transmitting means for adhering said image side of said transparency to said coating, a flat opaque base having a surface thereof positioned in contact with the opposite side of said transparency and formed with an aperture for framing said image, and cementing means for adhering said coating directly to said surface.

2. A lantern slide comprising, in combination, a transparent, rigid sheet, a light transmitting coating on one side of said sheet, a transparency having an image-bearing emulsion on one side thereof and positioned adjacent said coating, a light transmitting cement for adhering said emulsion to said coating to connect said transparency to said sheet, an opaque holder formed with a bottom having a surface positioned in contact with the other side of said transparency and formed with an image-framing aperture, and a cement for adhering said surface directly to said coating.

3. A lantern slide comprising, in combination, a transparent, rigid sheet, a light transmitting coating on one side of said sheet, a transparency having an image-bearing emulsion on one side thereof and positioned adjacent said coating, a light transmitting cement for adhering said emulsion to said coating to connect said transparency to said sheet, a holder formed with a flat bottom having a surface thereof in contact with the other side of said transparency and formed with an image-forming aperture, and a yieldable cement for adhesively connecting said coating directly to said surface.

4. A lantern slide comprising, in combination, a transparency having an image-bearing emulsion on one side thereof, a transparent rigid sheet, a gelatin coating on said sheet positioned adjacent said side of said transparency, a transparent cement for adhering said emulsion to said coating to connect said transparency to said sheet, said sheet being larger than said transparency in at least one direction to provide exposed gelatin coated areas projecting laterally from the opposite edges of said transparency, a cup-shaped holder formed with a bottom having a surface positioned in contact with the opposite side of said transparency and formed with an image-framing aperture, and a yieldable cement for adhering said areas directly to said surface.

5. A lantern slide comprising, in combination, a film transparency having an image-bearing emulsion on one side thereof, a transparent glass sheet of larger size than said transparency, a gelatin coating on one side of said sheet, said transparency being positioned substantially centrally on said sheet with said emulsion facing said coating, said sheet extending laterally beyond the edges of said transparency to provide exposed gelatin-coated areas, a transparent cement for connecting said emulsion adhesively to said coating to connect said transparency to said sheet, a holder comprising a flat base portion having a surface thereof in direct contact with the other side of said transparency and spaced from said areas, said portion being formed with an aperture to frame said image, and a yieldable cement for connecting at least certain of said areas adhesively to said surface to connect said transparency and sheet to said holder.

6. A lantern slide comprising, in combination, a film transparency having an image-bearing emulsion on one side thereof, a transparent glass sheet of larger size than said transparency, a gelatin coating on one side of said sheet, said transparency being positioned substantially centrally on said sheet with said emulsion facing said coating, said sheet extending laterally beyond the edges of said transparency to provide exposed gelatin-coated areas, a transparent cement for connecting said emulsion adhesively to said coating to connect said transparency to said sheet, a holder comprising a flat base portion having a surface thereof in direct contact with the other side of said transparency and spaced from said areas, said portion being formed with an aperture to frame said image, a yieldable cement for connecting at least certain of said areas adhesively to said surface to connect said transparency and sheet to said holder, and marginal flanges formed on said holder and extending normal to said base to overlie the edges only of said sheet, said sheet having the full area of the other surface thereof exposed.

7. A lantern slide comprising, in combination, a film transparency having an image-bearing emulsion on one side thereof, a transparent glass sheet of larger size than said transparency, a gelatin coating on one side of said sheet, said transparency being positioned substantially centrally on said sheet with said emulsion facing said coating, said sheet extending laterally beyond the edges of said transparency to provide exposed gelatin-coated areas, a transparent cement for connecting said emulsion adhesively to said coating to connect said transparency to said sheet, a holder comprising a flat base portion having a surface thereof in direct contact with the other side of said transparency and spaced from said areas, said portion being formed with an aperture to frame said image, a yieldable cement for connecting at least certain of said areas adhesively to said surface to connect said transparency and sheet to said holder, and marginal flanges formed on said holder and extending normal to said base to overlie the edges of said sheet and terminating in substantial alignment with the other side of said sheet so that the last mentioned side is exposed over its full area.

8. A lantern slide comprising, in combination, a film transparency having an image-bearing emulsion on one side thereof, a transparent glass sheet of larger size than said transparency, a gelatin coating on one side of said sheet, said transparency being positioned substantially centrally on said sheet with said emulsion facing said coating, said sheet extending laterally beyond the edges of said transparency to provide exposed gelatin-coated areas, a transparent cement for connecting said emulsion adhesively to said coating to connect said transparency to said sheet, a holder comprising a flat base portion having a surface thereof in direct contact with the other side of said transparency and spaced from said areas, said portion being formed with an aperture to frame said image, a cement for connecting adhesively at least an opposite pair of said areas directly to said surface outside said transparency, said last mentioned cement comprising 25% butyl methacrylate and 75% xylene, and marginal flanges on said holder overlying the edges of said glass sheet and terminating substantially in the plane of the other side of said sheet to expose said last-mentioned other side for the entire area thereof.

GEORGE J. KOCH.

REFERENCES CITED

The following references are of record in the file of this patent:

UNITED STATES PATENTS

| Number | Name | Date |
| --- | --- | --- |
| 11,267 | Cutting | July 11, 1854 |
| 1,224,442 | Brewster | May 1, 1917 |
| 1,467,108 | Hodgson | Sept. 4, 1923 |